(12) United States Patent
Kaneko et al.

(10) Patent No.: US 9,356,265 B2
(45) Date of Patent: May 31, 2016

(54) BATTERY PACK

(75) Inventors: Takashi Kaneko, Atsugi (JP);
Tomofumi Yoshinaga, Isehara (JP)

(73) Assignee: NISSAN MOTOR CO., LTD.,
Yokohama-shi (JP)

( * ) Notice: Subject to any disclaimer, the term of this patent is extended or adjusted under 35 U.S.C. 154(b) by 483 days.

(21) Appl. No.: 13/822,512

(22) PCT Filed: Oct. 6, 2011

(86) PCT No.: PCT/JP2011/073055
§ 371 (c)(1),
(2), (4) Date: Mar. 12, 2013

(87) PCT Pub. No.: WO2012/050038
PCT Pub. Date: Apr. 19, 2012

(65) Prior Publication Data
US 2013/0171488 A1      Jul. 4, 2013

(30) Foreign Application Priority Data

Oct. 15, 2010   (JP) ................. 2010-232324

(51) Int. Cl.
| H01M 2/20 | (2006.01) |
| H01M 2/22 | (2006.01) |
| H01M 2/24 | (2006.01) |
| H01M 2/26 | (2006.01) |
| H01M 2/10 | (2006.01) |

(52) U.S. Cl.
CPC .......... *H01M 2/1016* (2013.01); *H01M 2/1022* (2013.01); *H01M 2/1072* (2013.01); *H01M 2/1077* (2013.01); *H01M 2/206* (2013.01)

(58) Field of Classification Search
USPC .................. 429/149–160; 29/623.1–623.5
See application file for complete search history.

(56) References Cited

U.S. PATENT DOCUMENTS

2009/0297892 A1*  12/2009  Ijaz et al. .................. 429/7
2010/0266889 A1*  10/2010  Kim .................. H01M 2/202
                                                429/158

FOREIGN PATENT DOCUMENTS

JP    9-219181 A    8/1987
JP    7-211303 A    8/1995

OTHER PUBLICATIONS

Chinese Office Action dated Sep. 25, 2014, 6 pgs.

* cited by examiner

*Primary Examiner* — Basia Ridley
*Assistant Examiner* — Caitlin Wilmot
(74) *Attorney, Agent, or Firm* — Foley & Lardner LLP

(57) ABSTRACT

In a battery pack (1), first and second battery stacks (3, 5) are connected to each other via a connection member (7), each battery stack being formed by arranging multiple individual batteries (11) in a row direction. The connection member (7) is formed by repeatedly connecting a first connection part (13) and a second connection part (15), the first connection part (13) extending from the first battery stack (3) to the second battery stack (5) in an orthogonal direction, in which one end portion (13*b*) thereof supports the first battery stack (3) and another end portion (13*a*) supports the second battery stack (5), the second connection part (15) extending from the end portion (13*b*) of the first connection part (13) on the first battery stack (3) side toward the second battery stack (5) in a direction oblique to the orthogonal direction in a plan view.

11 Claims, 6 Drawing Sheets

BATTERY PACK

TECHNICAL FIELD

The present invention relates to a battery pack installed in an electric automobile or the like.

BACKGROUND ART

A battery pack conventionally known includes battery stacks each formed by arranging multiple individual batteries in a row direction (in a thickness direction of the batteries) (see, for example, Patent Document 1). In this battery pack, multiple rows of such battery stacks are arranged side by side with a predetermined distance therebetween in an orthogonal direction which is orthogonal to the row direction, and the battery stacks adjacent in the orthogonal direction are connected to each other with connection brackets of an X shape in a plan view. These connection brackets allow the battery stacks adjacent in the orthogonal direction to keep a constant distance therebetween.

PRIOR ART DOCUMENT

Patent Document

Patent Document 1: Japanese Patent Application Publication No. Hei 9 (1997)-219181

SUMMARY OF INVENTION

However, in the battery pack described in Patent Document 1, the adjacent battery stacks are connected to each other with the connection brackets of an X shape in a plan view. For this reason, when a load is applied to the battery pack in the orthogonal direction to make the adjacent battery stacks approach each other, individual batteries connected by the connection bracket move in the row direction to interfere with each other, and this might cause damage to the batteries.

In view of the above, the present invention has an objective of, while making adjacent battery stacks keep a constant distance from each other, preventing individual batteries in the battery stack from interfering with each other even when a load is applied in a direction orthogonal to a row direction.

The present invention provides a battery pack configured as follows. First, multiple individual batteries are arranged in a row direction to form a battery stack. Then, multiple rows of such battery stacks are arranged in an orthogonal direction which is orthogonal to the row direction to form a battery-stack group. Then, among these battery stacks, a certain battery stack and another battery stack adjacent to the certain battery stack are connected to each other via a connection member.

The connection member includes multiple first connection parts and a second connection part. The first connection parts each extend from the certain battery stack to the other adjacent battery stack in the orthogonal direction. Here, one end portion of each first connection part supports the certain battery stack and another end portion thereof supports the adjacent battery stack.

The second connection part is located between at least one pair of adjacent first connection parts of the multiple first connection parts, and connects an end portion of one of the first connection parts on the certain battery stack side to an end portion of the other one of the first connection parts on the other adjacent battery stack side.

Accordingly, with the adjacent battery stacks keeping a distance from each other, interference between the individual batteries of each battery stack can be prevented even when loads are applied in a direction orthogonal to the row direction.

More specifically, when loads are applied to the battery pack toward the inside thereof in the orthogonal direction, a reaction force toward the outside in the orthogonal direction is generated in each first connection part of the connection member. Thus, the adjacent battery stacks are prevented from approaching each other in the orthogonal direction, which can consequently prevent interference between the battery stacks.

Further, when loads are applied to the battery pack toward the inside thereof in the row direction, a reaction force toward the outside in a longitudinal direction of the second connection part is generated in the second connection part of the connection member. Thus, the individual batteries are prevented from approaching each other in the row direction, which can consequently prevent interference between the batteries.

Furthermore, when the loads in the row direction and the loads in the orthogonal direction are applied simultaneously, not only the interference between the adjacent battery stacks, but also the interference between the individual batteries can be prevented.

DESCRIPTION OF EMBODIMENTS

An embodiment of the present invention is described in detail with the drawings.

Figure 1:
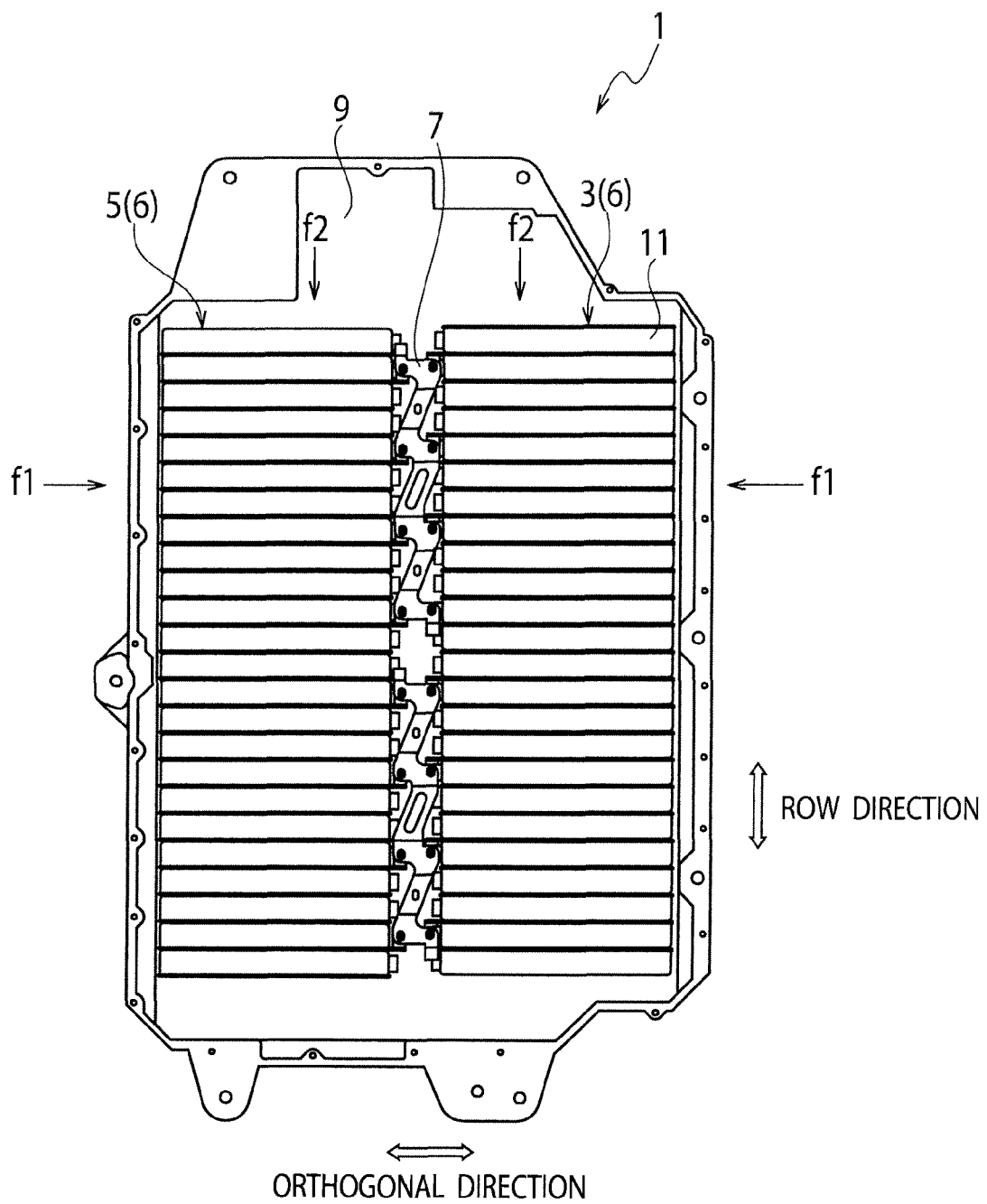
FIG. 1 is a plan view of a battery pack according to an embodiment of the present invention, seen from above.

As shown in FIG. 1, a battery pack 1 according to this embodiment includes a battery-stack group 6 having battery stacks 3, 5 arranged in two rows, a connection member 7 configured to connect the battery stacks 3, 5 of the battery-stack group 6 to each other, and a case 9 to house the battery stacks 3, 5 connected by the connection member 7. Note that a lid of the case 9 is not shown. Also, the number of battery stacks constituting the battery-stack group 6 is not limited to two, and may be three or more.

The battery stacks 3, 5 are each formed by arranging multiple individual batteries 11 each formed in a plate shape, in a thickness direction of the batteries 11 (a row direction). Then, the multiple battery stacks 3, 5 are arranged, with a predetermined distance therebetween, in an orthogonal direction (a direction along the surfaces of the batteries 11) which is orthogonal to the row direction. In this embodiment, the first battery stack 3 (a certain battery stack 3) arranged on the right side in FIG. 1 and the second battery stack 5 (an adjacent battery stack 5) arranged adjacently on the left side of the first battery stack 3 are provided.

Figure 2:
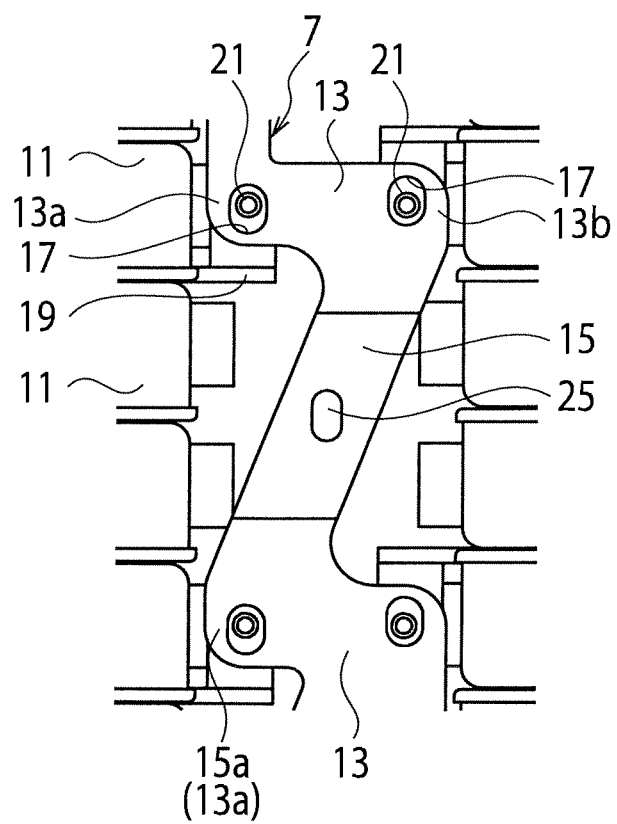
FIG. 2 is a plan view of a main part of FIG. 1 shown in an enlarged manner.
Figure 3:
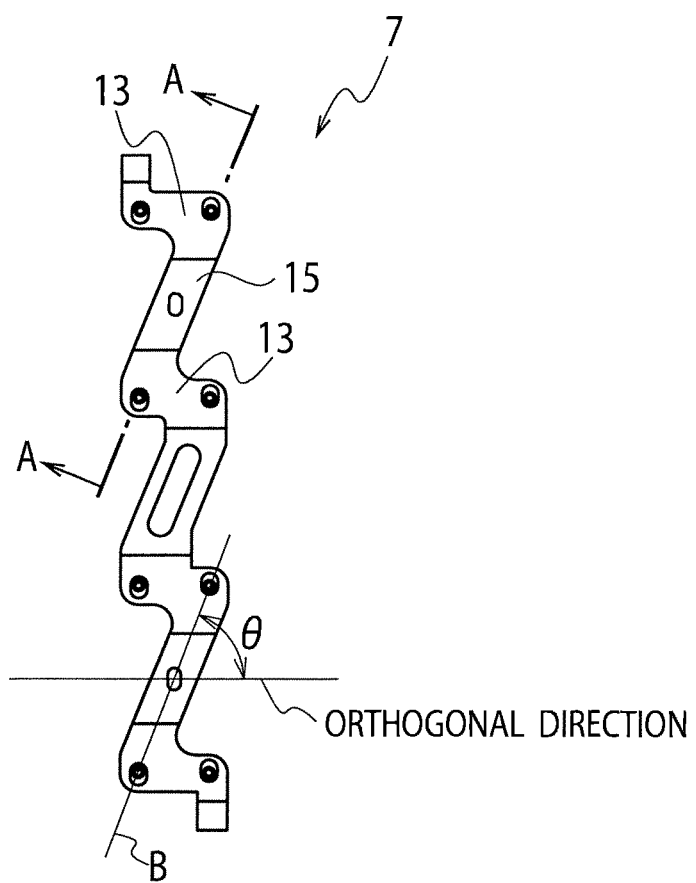
FIG. 3 is a plan view showing a connection member in FIG. 1.
Figure 4:
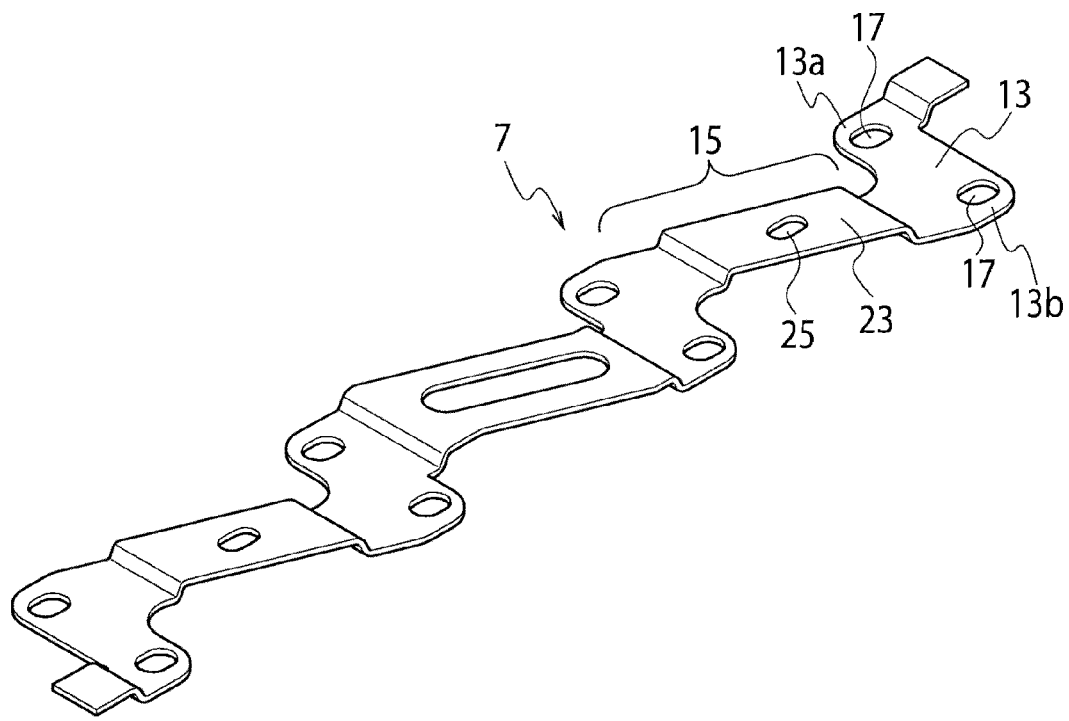
FIG. 4 is a perspective view showing the connection member in FIG. 1 in an enlarged manner.

As shown in FIGS. 2 to 4, the connection member 7 is formed integrally by connecting multiple connection parts having a Z shape in a plan view, in the longitudinal direction.

More specifically, as shown in FIGS. 2 and 3, the connection member 7 is formed by integrally and repeatedly connecting a first connection part 13 extending from the first battery stack 3 side to the second battery stack 5 side in the orthogonal direction, and a second connection part 15 extending from an end portion of the first connection part 13 on the first battery stack 3 side toward the second battery stack 5 in a direction oblique to the orthogonal direction. Accordingly, an end portion 15a of the second connection part 15 on the second battery stack 5 side coincides with an end portion 13a of the first connection part 13 on the second battery stack 5 side. A connection part of a Z shape in a plan view is formed by a certain first connection part 13, a second connection part 15 connected to the first connection part 13, and another first connection part 13 connected to the second connection part 15.

Particularly, as shown in FIG. 3, in the connection member 7 according to this embodiment, the second connection part 15 is provided between every adjacent ones of the multiple first connection parts 13, and all the second connection parts 15 extend in the same direction which is oblique to the orthogonal direction in a plan view.

In other words, an extending direction B of each second connection part 15 intersects the orthogonal direction at an angle θ. This angle θ is set to smaller than 90°.

Figure 5:
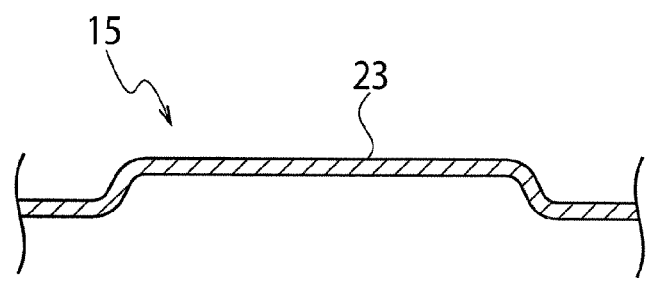
FIG. 5 is a sectional view taken along line A-A in FIG. 3.

Further, as shown in FIG. 4, support holes 17, 17 are formed in the left and right end portions 13a, 13b of each first connection part 13 of the connection member 7, respectively. Support pins 21 of support brackets 19 are inserted into these support holes 17, 17, and the connection member 7 is fixed to each support bracket 19 using a fastening member which is not shown. As shown in FIGS. 4 and 5, a protrusion portion 23 protruding upward is provided at a longitudinal middle portion of each second connection part 15 of the connection member 7. By this protrusion portion 23, the longitudinal cross section of the second connection part 15 is formed into a hat shape. An elliptical through-hole 25 extending long in the longitudinal direction of the connection member 7 (the row direction of the battery stacks 3, 5) is formed in the protrusion portion 23.

Further, as shown in FIG. 2, each support bracket 19 is held between the individual batteries 11, 11, and the battery stacks 3, 5 are supported by the support brackets 19. A tip end of each battery 11 is provided with a terminal (not shown in the figure).

Figure 6:
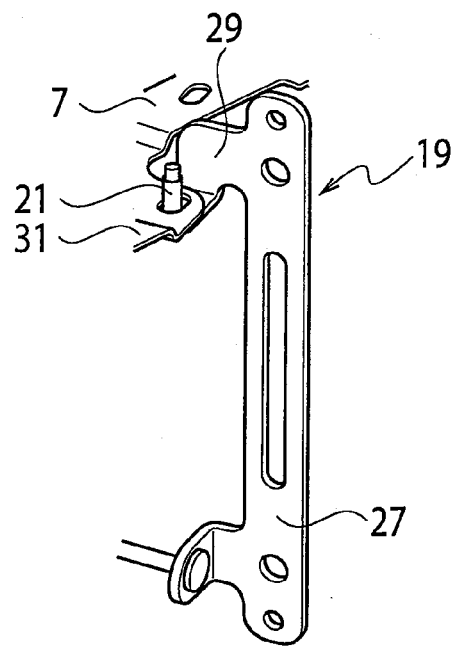
FIG. 6 is a perspective view showing how a support bracket is connected to the connection member.
Figure 7:
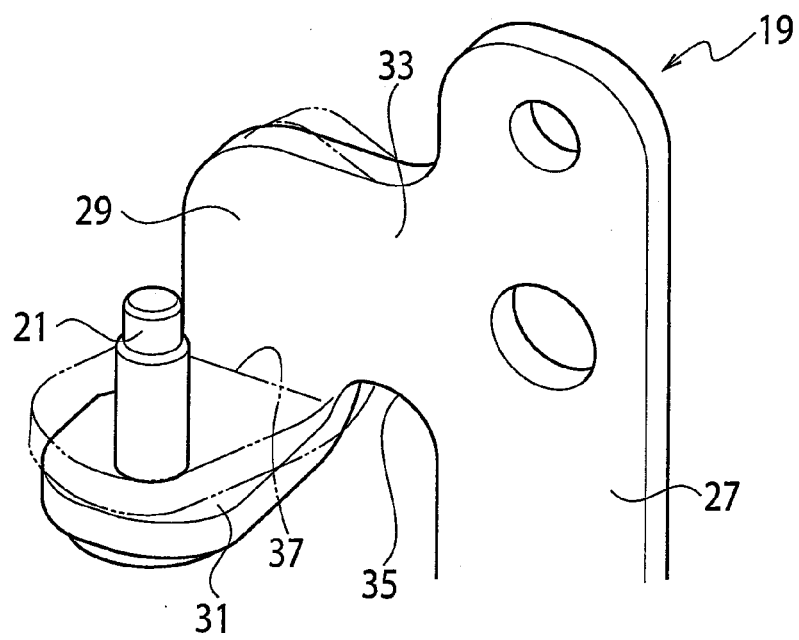
FIG. 7 is a perspective view showing an upper end portion of the support bracket in an enlarged manner.

As shown in FIGS. 6 and 7, each support bracket 19 is formed integrally of a body portion 27 held between the batteries 11, 11, a link portion 29 extending from an upper end of the body portion 27 in the orthogonal direction, and a support portion 31 being bent at and extending from a lower end of the link portion 29 in the row direction. The support portion 31 is provided with the support pin 21 protruding upward. As already described, this support pin 21 is inserted into and fastened to the corresponding support hole 17 of the connection member 7.

As shown in FIG. 7, an arcuate cutout 35 dented upward is formed in a lower portion of a base portion 33 of the link portion 29 of the support bracket 19. This cutout 35 makes the base portion 33 fragile, allowing the link portion 29 to elastically deform in a vertical direction with respect to the body portion 27, as shown with two-dot chain lines. Further, the support portion 31 is bent at the lower end of the link portion 29 and extends therefrom in the row direction, and this lower end is formed into a bent portion 37 as shown with two-dot chain lines. The support portion 31 can elastically deform at the bent portion 37 in the vertical direction with respect to the link portion 29.

Figure 8:
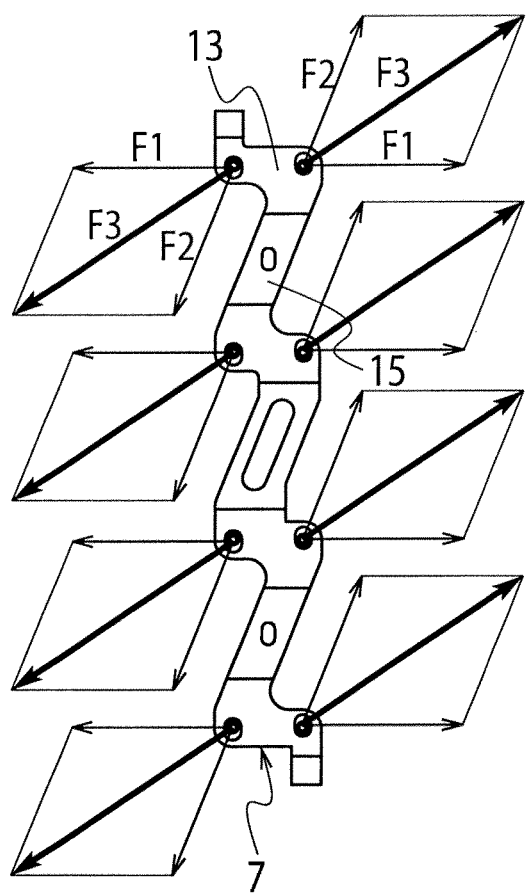
FIG. 8 is a schematic diagram showing reaction forces of the connection member generated when loads are applied to the battery pack.

Next, reaction forces generated in the connection member 7 when loads are applied to the battery pack 1 are described using FIG. 8.

First, when loads f1 are applied to the battery pack 1 toward the inside thereof in the orthogonal direction, as shown with arrows in FIG. 1, the left and right battery stacks 3, 5 slightly move to and thus approach each other.

Then, the support brackets 19 and the support pins 21 supporting the battery stacks 3, 5 also move in the orthogonal direction. Consequently, the support pins 21 are pushed against the circumferences of the corresponding support holes 17 of the connection member 7 (see FIG. 2). Thereby, as shown in FIG. 8, the first connection parts 13 of the connection member 7 are compressed from their both end portions in the orthogonal direction, and reaction forces F1 (see arrows in FIG. 8) are generated toward the outside in the orthogonal direction in such a manner as to react against the compression forces.

On the other hand, when loads f2 are applied to the battery pack 1 toward the inside thereof in the row direction as shown with arrows in FIG. 1, the individual batteries 11 constituting the left and right battery stacks 3, 5 slightly move in the row direction.

Then, the support brackets 19 and the support pins 21 supporting the battery stacks 3, 5 also move in the row direction. Consequently, the support pins 21 are pushed against the circumferences of the corresponding support holes 17 of the connection member 7 (see FIG. 2). Thereby, as shown in FIG. 8, the second connection parts 15 of the connection member 7 are compressed from their both longitudinal end portions, and reaction forces F2 (see arrows in FIG. 8) are generated toward the outside in the longitudinal direction in such a manner as to react against the compression forces.

Note that if the loads f1 and the loads f2 are applied to the battery pack 1 simultaneously, the reaction forces are combined forces F3 of F1 and F2 in FIG. 8.

The reaction forces F1 can prevent the left and right battery stacks 3, 5 from approaching each other in the orthogonal direction. Further, the reaction forces F2 can prevent the individual batteries 11, 11 from approaching each other in the row direction. Furthermore, the reaction forces F3 can not only prevent the left and right battery stacks 3, 5 from approaching each other in the orthogonal direction, but also prevent the individual batteries 11, 11 from approaching each other in the row direction.

Operation and advantageous effects of this embodiment are described below.

(1) The battery pack 1 according to this embodiment is constructed by arranging multiple individual batteries 11 in the row direction to form each of the battery stacks 3, 5, arranging the battery stacks 3, 5 in multiple rows in the orthogonal direction which is orthogonal to the row direction, and then connecting, via the connection member 7, the first battery stack 3 which is a certain battery stack to the second battery stack 5 which is a battery stack adjacent to the certain battery stack.

The connection member 7 includes the first connection parts 13 and the second connection parts 15.

Each first connection part 13 extends from the first battery stack 3 to the second battery stack 5 in the orthogonal direction. Here, one end portion 13b of each first connection part 13 supports the first battery stack 3 and the other end portion 13a thereof supports the second battery stack 5.

Each second connection part 15 extends from the end portion 13b of the first connection part 13 on the first battery stack 3 side toward the second battery stack 5 in a direction oblique to the orthogonal direction in a plan view.

Accordingly, when the loads f1 are applied to the battery pack 1 toward the inside thereof in the orthogonal direction, the reaction forces F1 are generated toward the outside in the orthogonal direction in the first connection parts 13 of the connection member 7. Further, when the loads f2 are applied to the battery pack 1 toward the inside thereof in the row direction, the reaction forces F2 are generated toward the outside in the longitudinal direction in the second connection parts 15 of the connection member 7. Furthermore, when the loads f1 and f2 are applied simultaneously, the combined forces F3 of the reaction forces F1 and F2 are generated.

The reaction forces F1 can prevent the left and right battery stacks 3, 5 from approaching each other in the orthogonal direction and thereby prevent interference between the battery stacks 3, 5. Meanwhile, the reaction forces F2 can prevent the individual batteries 11, 11 from approaching each other in the row direction and thereby prevent interference between the batteries 11, 11. Furthermore, the reaction forces F3 can prevent not only interference between the left and right battery stacks 3, 5, but also interference between the individual batteries 11, 11.

(2) The second connection part 15 is provided between every adjacent first connection parts 13, 13 of the multiple first connection parts 13, and all the second connection parts 15 extend in the same direction which is oblique to the orthogonal direction in a plan view.

Accordingly, when the loads f2 are applied to the battery pack 1 toward the inside thereof in the row direction, the reaction forces F2 are generated in the extending direction B of the second connection parts 15 (see FIGS. 3) as shown in FIG. 8. Since the second connection part 15 is provided between every adjacent first connection parts 13, 13, all the reaction forces F2 on the right side of the connection member 7 in FIG. 8 are directed to an upper right direction in FIG. 8. Moreover, all the reaction forces F2 on the left side of the connection member 7 in FIG. 8 are directed to a lower left direction in FIG. 8. Thus, the reaction forces F2 act on all of the individual batteries 11 constituting the first battery stack 3 to move them in the same direction, and the reaction forces F2 also act on all of the individual batteries 11 constituting the second battery stack 5 to move them in the same direction. Accordingly, the individual batteries can be efficiently prevented from approaching each other in the row direction and interfering with each other.

(3) The support brackets 19 are attached to each of the first battery stack 3 and the second battery stack 5, and these support brackets 19, 19 are connected to each other via the connection member 7.

These support brackets 19 enable the connection member 7 to couple the battery stacks 3, 5 efficiently.

(4) Each support bracket 19 is formed integrally of the body portion 27 held between the individual batteries 11, 11, the support portion 31 supported by the connection member 7, and the link portion 29 linking the body portion 27 and the support portion 31 to each other. At least the link portion 29 is configured to be elastically deformable.

Accordingly, when the loads f1, f2 are applied to the battery pack 1, impacts of the loads f1, f2 can be mitigated by the elastic deformation of the link portion 29.

(5) The support portion 31 is bent at and extends from the end portion of the link portion 29, and is configured to be elastically deformable at this bent portion 37 with respect to the link portion 29.

Accordingly, when the loads f1, f2 are applied to the battery pack 1, impacts of the loads f1, f2 can be mitigated by the elastic deformation of the support portion 31.

(6) The through-hole 25 is formed in the longitudinal middle portion of each second connection part 15 of the connection member 7.

For this reason, in the second connection part 15, a portion near the through-hole 25 is fragile. Accordingly, when a compression load is applied to the second connection part 15 in its longitudinal direction, the second connection part 15 elastically deforms by a large amount at the portion near the through-hole 25, allowing efficient mitigation of impacts of the loads f1, f2.

(7) The longitudinal middle portion of each second connection part 15 of the connection member 7 protrudes in the thickness direction of the connection member 7 in such a manner that the longitudinal cross section of the second connection part 15 is formed into a hat shape.

Accordingly, when a compression load is applied to the second connection part 15 in its longitudinal direction, the second connection part 15 easily deforms by being bent upward which is the direction of the protrusion. Thus, impacts of the loads f1, f2 can be efficiently mitigated.

The entire contents of Japanese Patent Application No. 2010-232324 (filed on Oct. 15, 2010) are incorporated herein by reference.

Although the present invention has been described through the embodiment, it is obvious to those skilled in the art that the present invention is not limited to the foregoing description and can be modified and improved variously.

INDUSTRIAL APPLICABILITY

According to the battery pack according to the present invention in which battery stacks each having stacked batteries are arranged in rows, adjacent battery stacks can keep a distance from each other, and interference between individual batteries in each battery stack can be prevented.

REFERENCE SIGNS LIST 1 battery pack
3 first battery stack (certain battery stack)
5 second battery stack (adjacent battery stack)
6 battery-stack group
7 connection member
11 battery
13 first connection part
15 second connection part
19 support bracket
23 protrusion portion
25 through-hole
27 body portion
29 link portion
37 bent portion

The invention claimed is:
1. A battery pack comprising:
a battery-stack group formed by arranging a plurality of battery stacks in a plurality of rows in an orthogonal direction orthogonal to a row direction, each battery stack being formed by arranging a plurality of individual batteries in the row direction; and a connection member configured to connect a certain battery stack of the battery-stack group to another battery stack of the battery-stack group adjacent to the certain battery stack, wherein the connection member includes a plurality of first connection parts extending from the certain battery stack to the adjacent battery stack in the orthogonal direction, in which one end portion of each first connection part supports the certain battery stack and another end portion of each first connection part supports the adjacent battery stack, and at least one second connection part located between at least one pair of first connection parts adjacent to each other among the plurality of first connection parts, the at least one second connection part connecting an end portion of one of the pair of first connection parts on the certain battery stack side to an end portion of another one of the pair of first connection parts on the adjacent battery stack side, and terminals of the plurality of individual batteries in the certain battery stack face terminals of the plurality of individual batteries in the adjacent battery stack.

2. The battery pack according to claim 1, wherein
the connection member includes a plurality of second connection parts,
one second connection part from the plurality of second connection parts is provided between every adjacent pair of first connection parts, and
each of the plurality of second connection parts extends in a same direction which is oblique to the orthogonal direction in a plan view.

3. The battery pack according to claim 1, wherein
support brackets are attached to the certain battery stack and the adjacent battery stack, respectively, and
the support brackets are connected to each other via the connection member.

4. The battery pack according to claim 3, wherein
the support brackets are each formed integrally of a body portion held between the individual batteries, a support portion supported by the connection member, and a link portion linking the body portion and the support portion to each other, and
at least the link portion is configured to be elastically deformable.

5. The battery pack according to claim 4, wherein
the support portion is bent at and extends from an end portion of the link portion, and
the support portion is configured to be elastically deformable at the bent portion provided at the end portion, with respect to the link portion.

6. The battery pack according to claim 1, wherein
a through-hole is formed in a longitudinal middle portion of the at least one second connection part of the connection member.

7. The battery pack according to claim 1, wherein
a longitudinal middle portion of the at least one second connection part of the connection member protrudes in a thickness direction of the connection member in such a manner that a longitudinal cross section of the at least one second connection part is formed into a hat shape.

8. The battery pack according to claim 1, wherein
a central portion of each of the plurality of individual batteries in the certain battery stack is aligned with a central portion of one of the plurality of individual batteries in the adjacent battery stack.

9. The battery pack according to claim 1, wherein
each first connection part extends from a central portion of an individual battery in the certain battery stack to a central portion of an individual battery in the adjacent battery stack.

10. The battery pack according to claim 1, wherein the connection member has a Z shape in a plan view.

11. The battery pack according to claim 1, wherein one end portion of each first connection part supports an end of the certain battery stack and another end portion of each first connection part supports an end of the adjacent battery stack.

* * * * *